Feb. 1, 1955               E. RITTER             2,700,995
APPARATUS TO PRODUCE SHAVINGS FROM
SOLID MATERIALS SUCH AS SOAP
Filed April 2, 1952
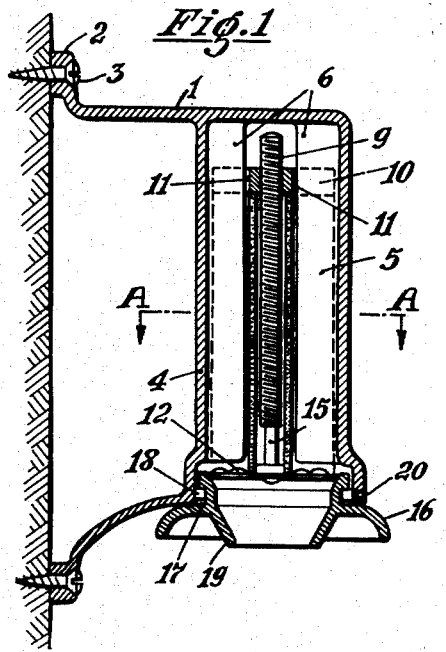
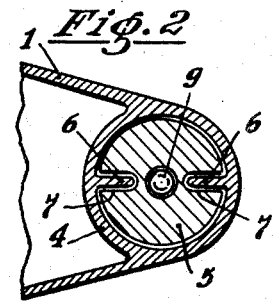
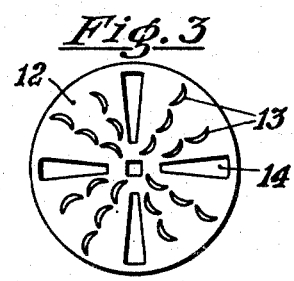
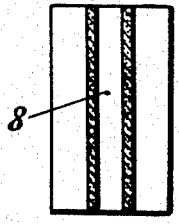 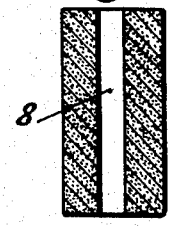 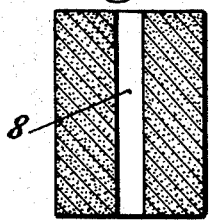 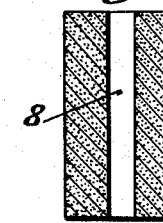
 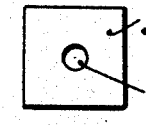 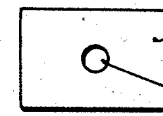 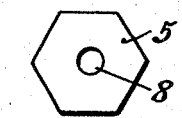
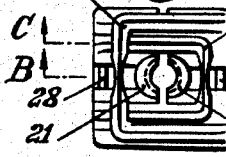 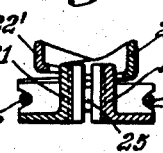 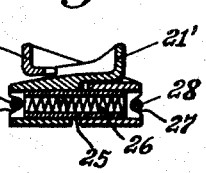
INVENTOR
ERNST RITTER
By E.J. Freeman
ATTORNEY.

United States Patent Office 2,700,995
Patented Feb. 1, 1955

2,700,995

APPARATUS TO PRODUCE SHAVINGS FROM SOLID MATERIALS SUCH AS SOAP

Ernst Ritter, St. Gallen, Switzerland

Application April 2, 1952, Serial No. 280,109

Claims priority, application Netherlands April 4, 1951

5 Claims. (Cl. 146—61)

This invention relates to apparatus in which a solid material such as soap is subjected to a milling or scraping device to produce from such material suitable shavings.

An object of this invention is to provide for such apparatus in which the scraping or milling device, as well as the feed-mechanism are adapted for particularly reliable functioning. A particular feature is the accomplishment of uniform shaving, or planing of the said solid material, and of feeding mechanism with which to produce adequate movement towards a milling disc.

According to my invention I provide for an apparatus, in which the housing acts also as a guide of the solid material. A hand wheel is in rotational connection with the milling disc and the feeding mechanism. The solid material is of complementary shape to the guide-part of the housing. A longitudinal central bore of the solid material permits suitable location of a feed-rod, which is firmly attached to the milling disc. The milling disc is firmly attached to the hand wheel, whereby the feeding and shaving operations are accomplished by said hand-wheel. The hand-wheel, with its hub part is disposed to protrude into the bottom opening of the housing. The hand-wheel together with the thereto attached parts, is removably mounted onto the housing, providing thereby for easy reloading and also inspection of the apparatus.

An embodiment of the invention and a detailed modification are illustrated by way of example in the accompanying drawing, in which:

Fig. 1 being a vertical section of an apparatus for cylindrical pieces of soap;

Fig. 2 is a cross-section on the line A—A in Fig. 1;

Fig. 3 is an enlarged plan view of the milling disc;

Figs. 4, 6, 8 and 10 are axial sections and

Figs. 5, 7, 9 and 11 respective plan views of soap pieces for use in the apparatus;

Fig. 12 is a plan-view of a feed-fitting consisting of two parts;

Fig. 13 is a section on the line B—B of Fig. 12;

Fig. 14 is a section on the line C—C of Fig. 12.

The apparatus shown in the drawings consists of a housing 1 which with its flange part 2 is fastened to a wall by screws 3. The other part of the housing is formed as a cylindrical container 4 for pieces of soap 5. The container 4 has two diametrically opposed longitudinally extending ribs 6, and the piece of soap is formed with thereto corresponding depressions 7; the ribs 6 engage the depressions 7 and guide the piece 5 longitudinally and lock it against rotation.

The soap piece 5 has a bore hole 8 which is occupied by a feed-rod 9 with saw-tooth threading. The feed rod 9 engages a feed-fitting 10, the latter has spaced out portions 11 which correspond to the depressions of the piece 5, and to guidingly co-act with the ribs 6. The lower end of the rod 9 is attached to the milling or scraping disc 12, which is formed with scraping cams 13 and four radial slots 14.

Adjacent the disc 12 the threading of the feed rod is discontinued providing for an unthreaded portion 15, in this zone the feeding movement of the fitting 10 will no longer take place, the piece of soap is then reduced to a small end-piece. A hand wheel 16 is fastened to the disc 12. The hand-wheel has an annular slot 17 in which a circumferentially resilient ring 18 is placed. The container 4 is at its bottom end of a greater opening, wherein an extension of the hub-portion of the hand-wheel 16 is rotatably located. The ring 18 is held within the annular slot 17 by its resiliency. The hand-wheel is held by a push button type connection. The hand-wheel 16 has a central opening and a discharge header 19 is connected therewith for the discharge of the shavings of the piece of soap 5. 20 is a set-screw to fix the annular ring 18 and to prevent thereby inadvertent removal of the piece of soap.

On loosening of the set screw 20 the ring 18 is freed; in this condition the feed mechanism 9—18 may be removed by pulling the hand-wheel downwards; by this manipulation the piece of soap may be easily replaced, wherefor only the feeding disc 10 is to be removed. After the new piece of soap has been inserted and the feed fitting replaced, the whole mechanism is put back into the housing, when it is held in place by the ring 18. When the apparatus is used in public places, the screw 20 is set tight to prevent unauthorized removal of the mechanism.

For quick reloading of the apparatus the feeding device 10 is preferably divided in two halves 21 and 22 as shown in Figs. 12–14. Each half has a finger piece 21' and 22'. On each side of the two halves there are bores into which guide tubes 25 are inserted and upon which the halves 21, 22 can be displaced. The tubes 25 have springs 26 therein, and which are attached at 28. The spring 26 pull the two halves towards each other pressing upon the feed rod 15, when mounted thereon.

By pressing the fingerholds 21', 22' together the two halves are moved from each other against the force of the spring 26; they are thereby quickly displaced upon the feed rod 9. When the fingerholds are released the two halves return onto the threading of the feed-rod.

I claim:

1. A device for dispensing and scraping soap, cheese and the like comprising a cylindrical vertical container being closed at the upper end to accommodate said materials, a circumferentially threaded spindle centrally located in said container and reaching in the vicinity of its upper end, a disc for the advance of said materials through said container screwed on said spindle and having a diameter slightly smaller than the one of said container to effect the downward passage of said materials through said container upon rotation of said spindle, a circular disc-shaped scraper and a handwheel fastened to the lower end of said spindle and reaching into the lower part of said container, said handwheel, said scraper, said spindle and said disc forming a single operating unit to be centered from below into said container and a resilient ring located between the open-end portion of said container and said handwheel to secure said unit in its operative position in the open-end portion of said container.

2. A device for dispensing and scraping soap, cheese and the like comprising a cylindrical vertical container being closed at the upper end to accommodate said materials, a circumferentially threaded spindle centrally located in said container and reaching in the vicinity of its upper end, a disc for the advance of said materials through said container screwed on said spindle and having a diameter slightly smaller than the one of said container to effect the downward passage of said materials through said container upon rotation of said spindle, a circular disc-shaped scraper and a handwheel fastened to the lower end of said spindle reaching into the lower part of said container, said handwheel, said scraper, said spindle and said disc forming a single operating unit to be centered from below into said container and a resilient ring located between the open-end portion of said container and said handwheel to secure said unit in its operative position in the open-end portion of said container, said resilient member having the shape of a ring and said handwheel being provided with an annular upward extension, a circular outside slot in said extension for the accommodation of said resilient ring, the lower end of said container being enlarged to receive said annular extension.

3. In a device according to claim 1, said vertically movable disc being provided with two guide tubes carrying the components of a bipartite advance screw, said components being connected by two springs traversing said guide tubes.

4. In a device according to claim 1, two vertical ribs oppositely extending from the container wall towards the center of the container.

5. In a device according to claim 2, a screw located in the lower-end portion of said container to fix the resilient ring in its operative position.

References Cited in the file of this patent

UNITED STATES PATENTS

| | | |
|---|---|---|
| 901,151 | Casey | Oct. 13, 1908 |
| 936,101 | Edwards | Oct. 5, 1909 |
| 1,095,215 | Jones | May 5, 1914 |
| 1,659,254 | Finger | Feb. 14, 1928 |
| 1,973,256 | Hughes | Sept. 11, 1934 |
| 2,342,892 | Prinz | Feb. 29, 1944 |
| 2,487,597 | Sampson | Nov. 8, 1949 |